United States Patent [19]

Schneider

[11] 4,305,710
[45] Dec. 15, 1981

[54] SHIP PROPULSION TRANSMISSION HAVING A TORQUE CONVERTER FOR DRIVING A FIXED PITCH PROPELLER IN REVERSE

[75] Inventor: Raymond C. Schneider, Rockford, Ill.

[73] Assignee: Twin Disc, Incorporated, Racine, Wis.

[21] Appl. No.: 48,077

[22] Filed: Jun. 13, 1979

[51] Int. Cl.³ .......................................... B63H 23/26
[52] U.S. Cl. ........................................ 440/75; 74/688;
74/720; 74/720.5; 74/DIG. 8
[58] Field of Search ................ 74/DIG. 8, 720, 720.5,
74/687, 688; 440/75

[56] References Cited

U.S. PATENT DOCUMENTS

| | | | |
|---|---|---|---|
| 2,140,324 | 12/1938 | Lysholm | 60/332 X |
| 2,749,776 | 6/1956 | Fischer et al. | 115/34 R |
| 2,996,932 | 8/1961 | Gsching | 74/688 X |
| 3,352,395 | 11/1967 | Hilpert | 192/85 R |
| 3,360,935 | 1/1968 | Schneider | 60/361 |
| 3,388,684 | 6/1968 | Gros et al. | 74/720 X |
| 3,833,100 | 9/1974 | Aschauer | 192/85 |
| 4,009,571 | 3/1977 | Black et al. | 60/354 |
| 4,012,908 | 3/1977 | Dundore | 60/354 |
| 4,242,925 | 1/1981 | Farkas | 74/792 |
| 4,245,520 | 1/1981 | Semar | 74/377 |

FOREIGN PATENT DOCUMENTS 547330  1/1942  United Kingdom ............. 115/34 R

*Primary Examiner*—Sherman D. Basinger
*Attorney, Agent, or Firm*—James E. Nilles

[57] ABSTRACT

A propulsion transmission for driving a fixed pitch propeller of a ship, the transmission including a prime mover, that is a power source, such as a gas turbine engine, or a diesel engine for example, and also having a disengageable clutch between the prime mover and the propeller and for transmitting power to the propeller for driving it in a forward direction. The transmission also includes a hydraulic torque converter of the single stage, fixed housing type and which is connected between the prime mover and the propeller for driving the propeller in the reverse direction when the disengageable clutch is inoperative.

25 Claims, 30 Drawing Figures

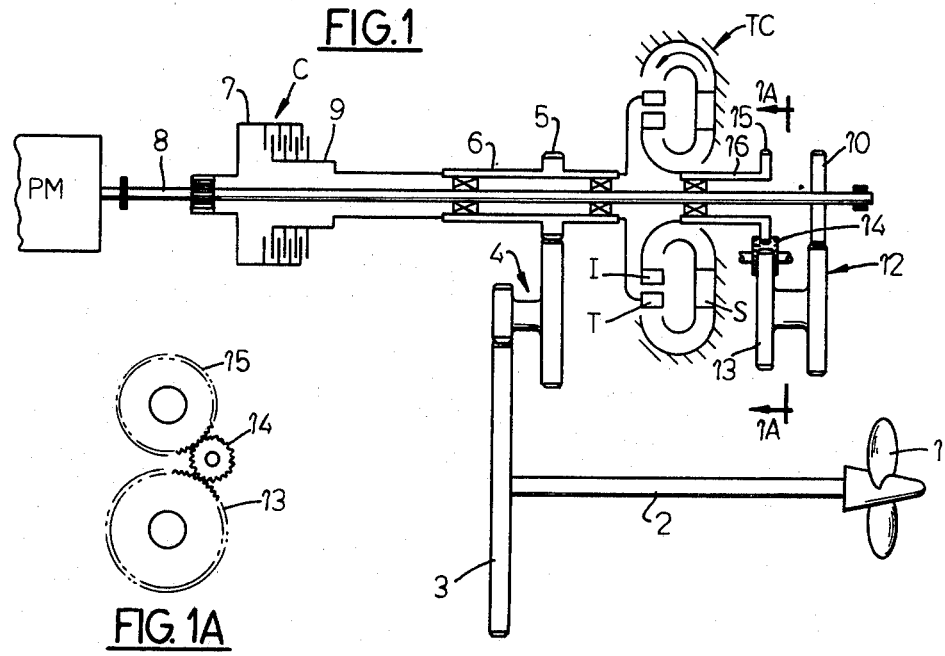
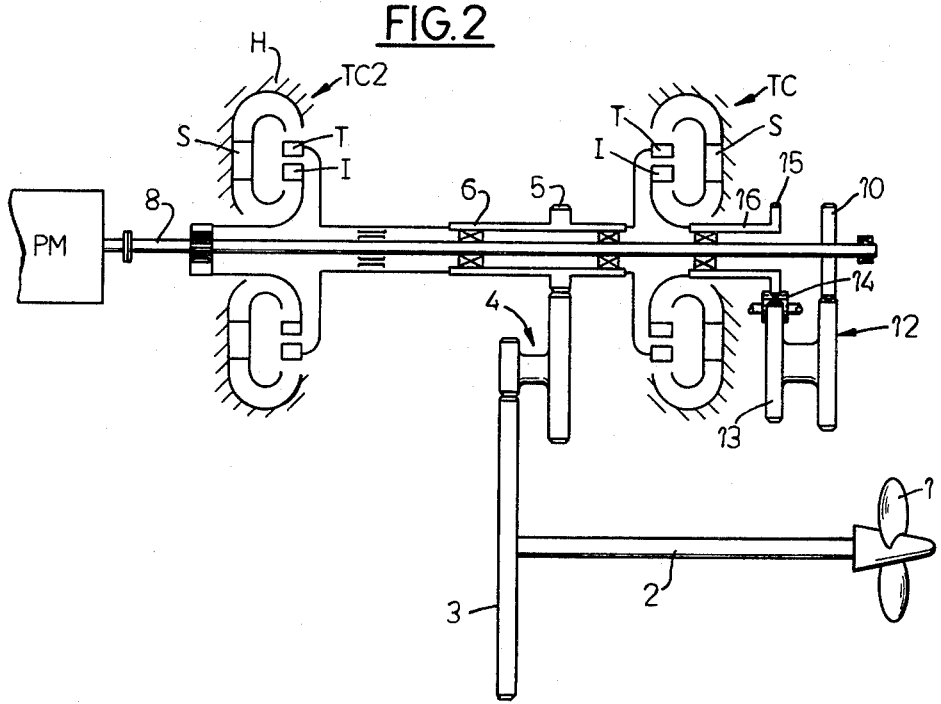

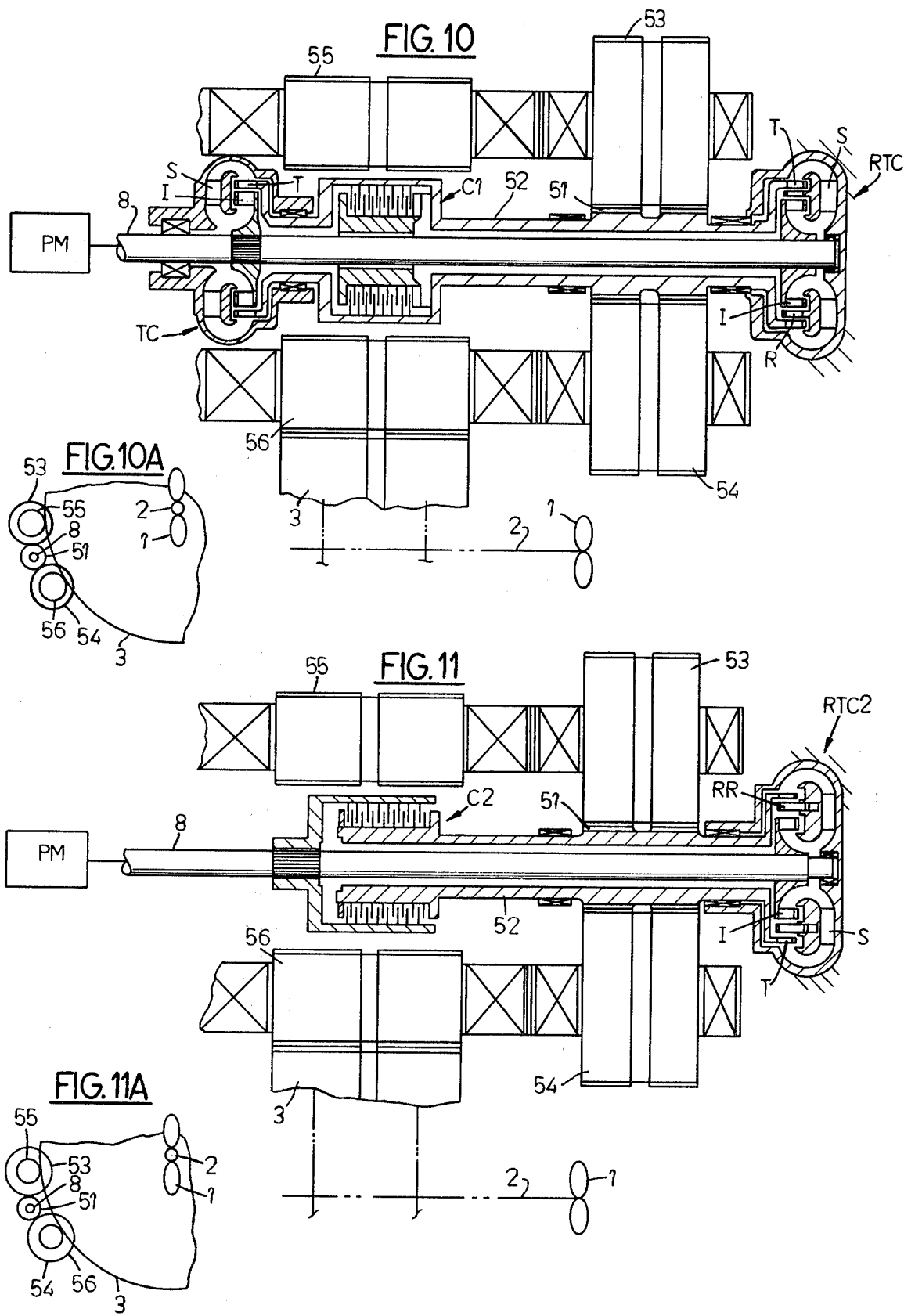

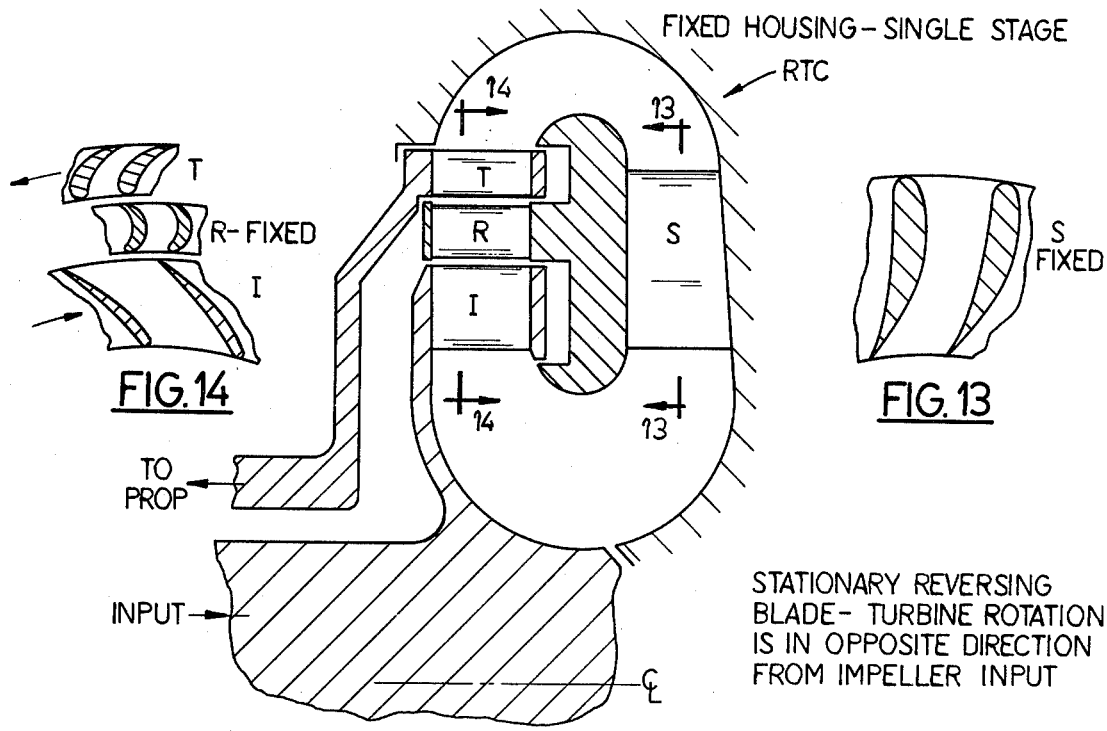
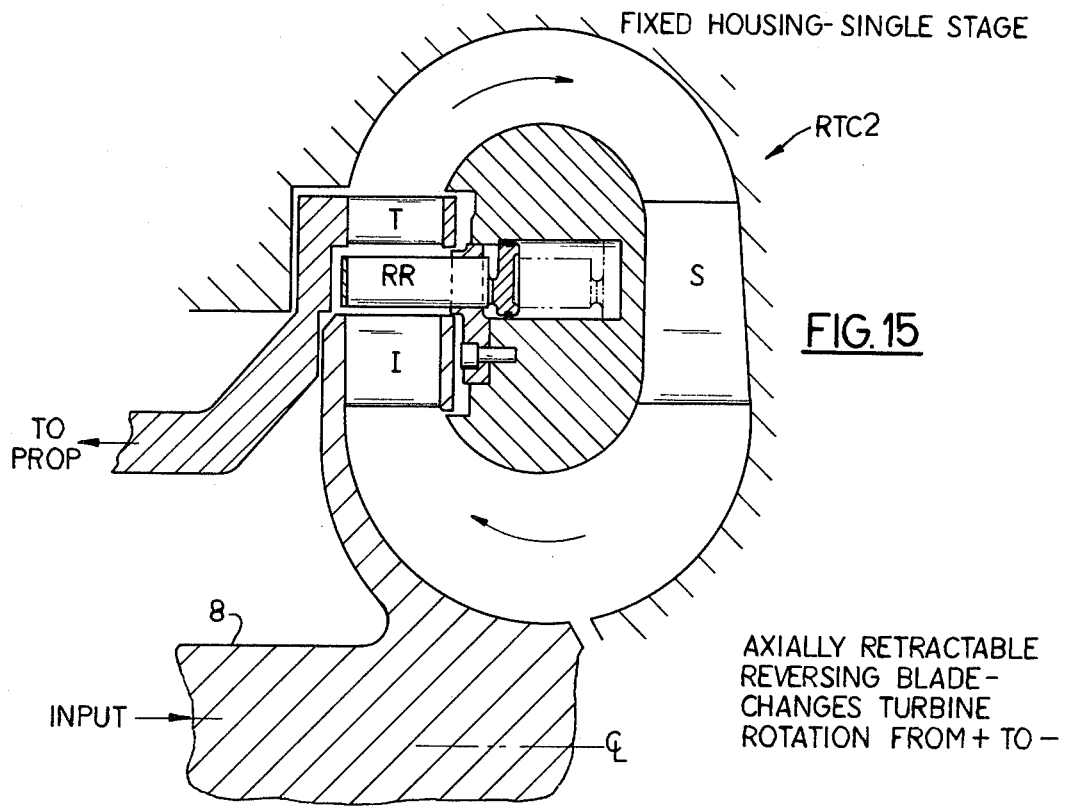

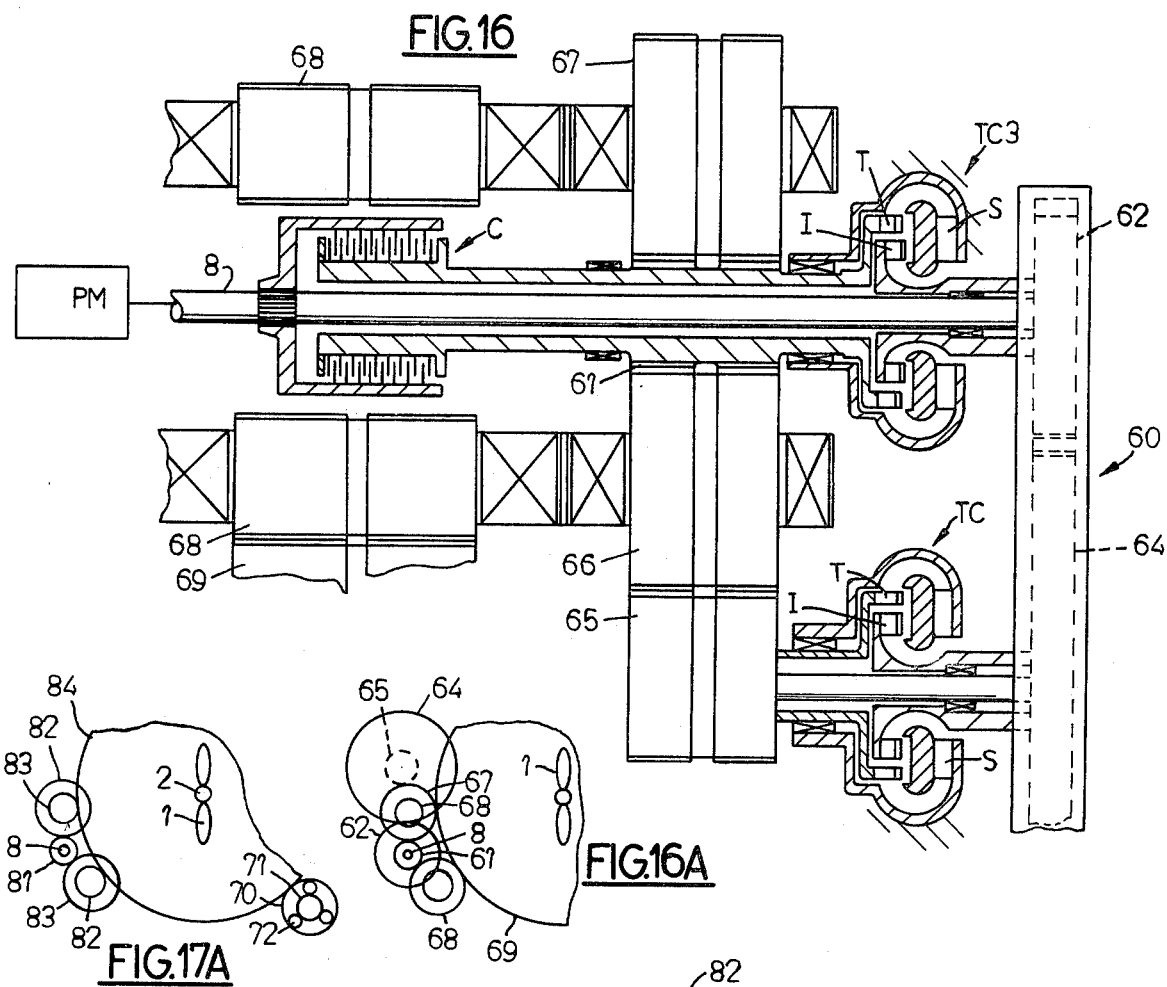
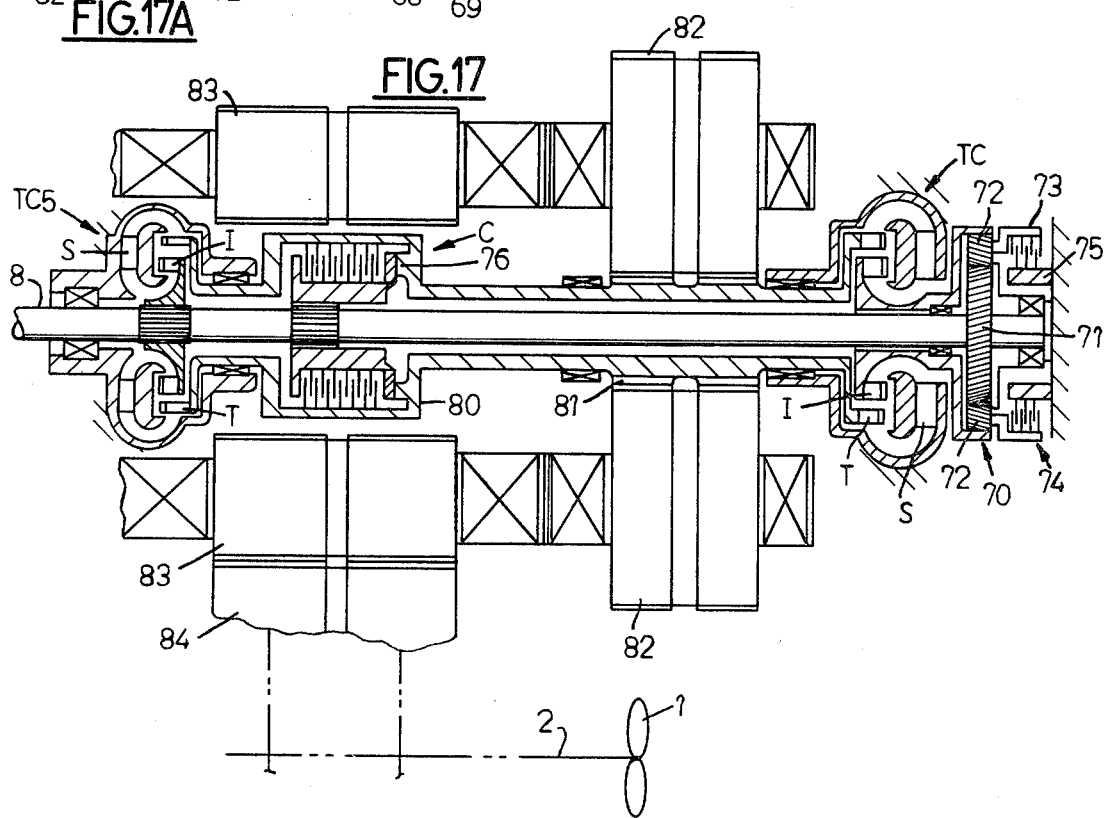

SHIP PROPULSION TRANSMISSION HAVING A TORQUE CONVERTER FOR DRIVING A FIXED PITCH PROPELLER IN REVERSE

BACKGROUND OF THE INVENTION

The present invention pertains to propulsion transmissions for large ships which are capable of operating at high speeds. Ships of this character utilize large prime movers or power sources, such as gas turbine engines or diesel engines for example, and conventionally use controllable pitch propellers as a means for reversing the direction of the ship. These transmissions utilize marine reduction gear means that have no capability of reversing the direction of propeller rotation. Serious problems are encountered with controllable pitch propellers when used in such transmissions because the propellers often fail, have high maintenance, and require drydocking of the ship and consequent periods of inoperativeness.

In ships of the character to which the present invention pertains, it is desirable to be able to reverse the direction of the ship, sometimes in "crash reversal" conditions, and to do so requires that the transmission must bring the forwardly rotating ship propeller to a stop and then reverse it even while the ship itself continues forward at appreciable speed. These "crash reversals" cause this transient condition of propeller reversal to be undertaken at very high forward ship velocities so that minimum "reach" (continued forward travel of the ship) is possible.

When the prior art transmissions have been utilized under such conditions, the reversal of the propeller causes severe forces to be transmitted back to the prime mover and other interconnecting components, such as clutches. Among some prior art arrangements was the use of a friction clutch for both forward and reverse operation. In order to protect the prime mover, such as a gas turbine, these clutches had to provide a synchronized lock-up and no slip drive at full engine power ahead or astern, had to provide modulation of low propeller speeds, and prime mover speeds of less than full throttle necessitated that the clutch would slip continuously without thermal damage and with excellent propeller speed control at propeller speeds of one-half normal down to the minimum speed expected. Furthermore, the same clutches had to be of a fixed size and of a thermal capacity to reverse the propeller from its former direction to that required, notwithstanding the severe propeller and ship hull dynamics involved.

In transmissions of the above character, there are a number of limiting parameters, one of which is the hull speed at which it is necessary to reverse the propeller direction. This particular parameter directly effects the distance that the ship will travel before actually stopping (reach).

Solutions of this transient reversal problem include a number of sequential steps to finally achieve reverse propeller rotation. Some of these consist of a variety of devices that first slow down the propeller, discretely stop and hold the propeller in a stalled condition, and then initiate propeller rotation in the reverse direction and finally achieve steady-state reverse operation.

Other prior attempts have been made to provide suitable transmissions for reversing large ships. An example of one such transmission is shown in the U.S. Pat. to Lysholm No. 2,140,324 issued Dec. 13, 1938 which utilized a three stage torque converter that drove a hydraulic coupling which could be selectively braked to reverse the power direction. This arrangement however made the reversal assume the characteristics of the simple hydraulic coupling and consequently, when the ship prime mover interaction made the coupling reach a negative speed ratio, it was impossible to get the necessary high output torque and instead the output torque decayed rapidly when operating in the reverse direction.

Another example of a prior art transmission of this general character is shown in the British Pat. No. 547,330 of 1942 wherein simple fluid couplings were used, but which were also incapable of torque amplification in reverse. This transmission also resulted in the output torque collapsing completely and quickly in the negative speed ratio zone of near minus (−) 1.0.

Neither of the two prior art transmissions could provide any torque amplification in the negative speed zones. If the coupling were sized to provide large torques in the negative speed ratio operational zone, then these torques would be reflected back into the prime mover.

SUMMARY OF THE PRESENT INVENTION

The present invention provides a propulsion transmission for a ship which includes a prime mover and a fixed pitch propeller, disengagable means between the prime mover and the propeller and for driving the propeller in the forward direction when the disengagable means is engaged, and also includes a hydraulic torque converter of the single stage, fixed housing type connected between the prime mover and the propeller for driving the propeller in the reverse direction when the disengagable means is disengaged.

The arrangement of the present transmission is such that high output torque is provided by the torque converter in the negative speed ratio range, and high forces are prevented from being transmitted to the prime mover or other components of the transmission located ahead of the torque converter.

The transmission provided by the present invention utilizes a hydraulic torque converter of the single stage, fixed housing type for steady-state operations, for slow speed maneuvering in reverse and which arrangement operates completely automatically from forward to astern with no sequencing steps being necessary. The transmission, and particularly the specific torque converter used therewith, has unique performance characteristics and can initiate propeller reversals from 100 percent forward speed of the ship and at the same time not reflect any high load or "lug" imposition on the prime mover during this transient mode. The heat produced, even during "crash reversals" is generated within the envelope of the torque converter and can be dissipated through heat exchangers at high flow rates.

The transmission provided by the present invention is particularly efficient in both forward and reverse operations, and does not impose excessively high loads on components of the transmission.

These and other objects and advantages of the present invention will appear hereinafter as this disclosure progresses, reference being had to the accompanying drawings.

THE DRAWINGS

FIG. 1 is a schematic view of a transmission made in accordance with the present invention;

FIG. 1a is a schematic, transverse sectional view taken along the line 1a—1a in FIG. 1 and showing the reversing gear means;

FIG. 2 is another schematic of a modified form of the transmission shown in FIG. 1, the clutch of FIG. 1 being replaced with a torque converter (TC2) as the disengageable means;

FIG. 5a is a fragmentary, sectional view taken along the line 5a—5a in FIG. 5 and showing the form of the stator blades;

FIG. 5b is a fragmentary, cross sectional view taken generally along the line 5b—5b in FIG. 5 and showing the shape of the impeller and turbine blades;

FIG. 10 is another modified form of the invention, the view being more or less schematic in nature and certain parts being shown in section or broken away for the sake of clarity;

FIG. 10a is a schematic, transverse cross sectional view of the gear arrangement shown in FIG. 10, but on a reduced scale;

FIG. 11 is still another modified form of the invention, the view being more or less schematic in nature and certain parts being shown in section or broken away for the sake of clarity;

FIG. 11a is a schematic, transverse cross sectional view of the gear arrangement shown in FIG. 11, but on a reduced scale;

FIG. 12 is an enlarged, fragmentary view of a portion of the torque converter shown in FIG. 10;

FIG. 13 is a sectional view taken along line 13—13 in FIG. 12 and showing the shape of the stator blades;

FIG. 14 is a sectional view taken along the line 14—14 in FIG. 12 and showing the shape of the impeller blades, the reversing blades and the turbine blades;

FIG. 15 is an enlarged, fragmentary sectional view of a portion of the torque converter shown in FIG. 11;

FIG. 16 is a view of another form of the invention, more or less in schematic form, and with certain parts shown in section or broken away for the sake of clarity;

FIG. 16a is a schematic, transverse cross sectional view of the gear arrangement shown in FIG. 16, but on a reduced scale;

FIG. 17 is another modification of the invention in schematic form with the certain parts being shown in section or broken away for the sake of clarity in the drawings;

FIG. 17a is a transverse, schematic, sectional view of the gear arrangement shown in FIG. 17, but on a reduced scale;

Figure 22:
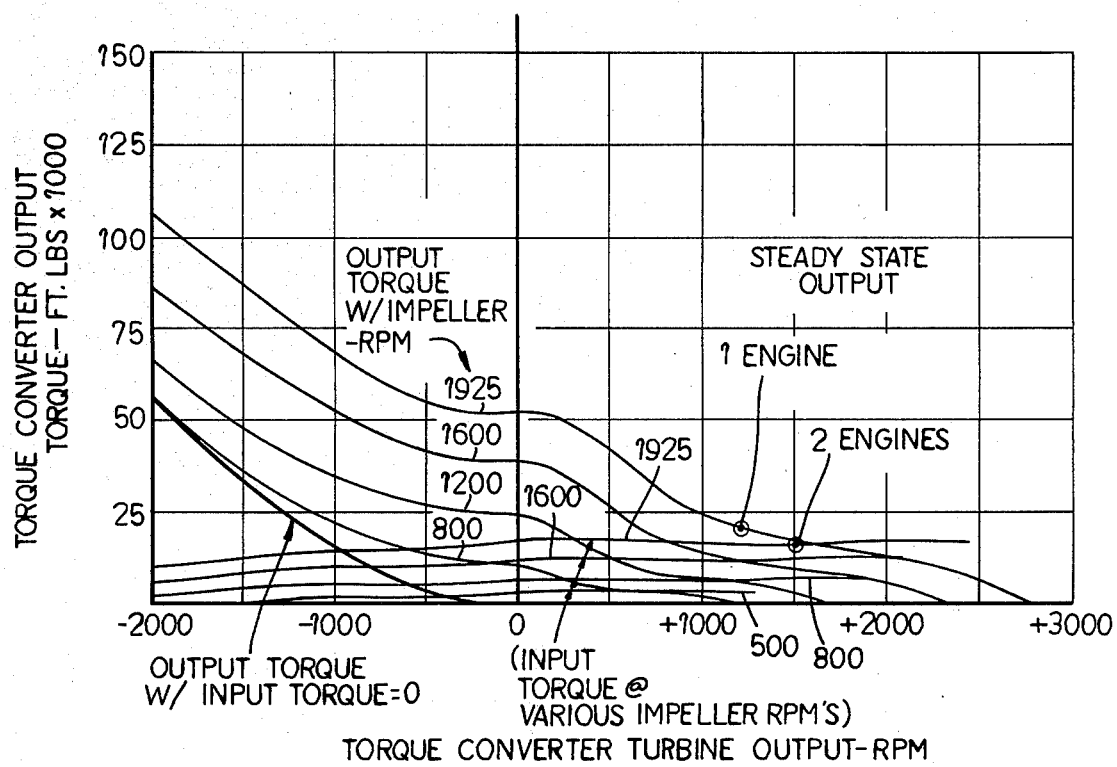

FIG. 22 is a graph of the present torque converter characteristics and showing the converter turbine speed in both forward and reverse directions, plotted against the torque converter output torque and input torque. FIG. 22 plots the same data as shown in speed ratio form in FIG. 19. Examination of this curve shows the continuously rising output torque present during reverse turbine speed operation with simultaneous decreasing, but still positive, input torque requirements.

Figure 23:
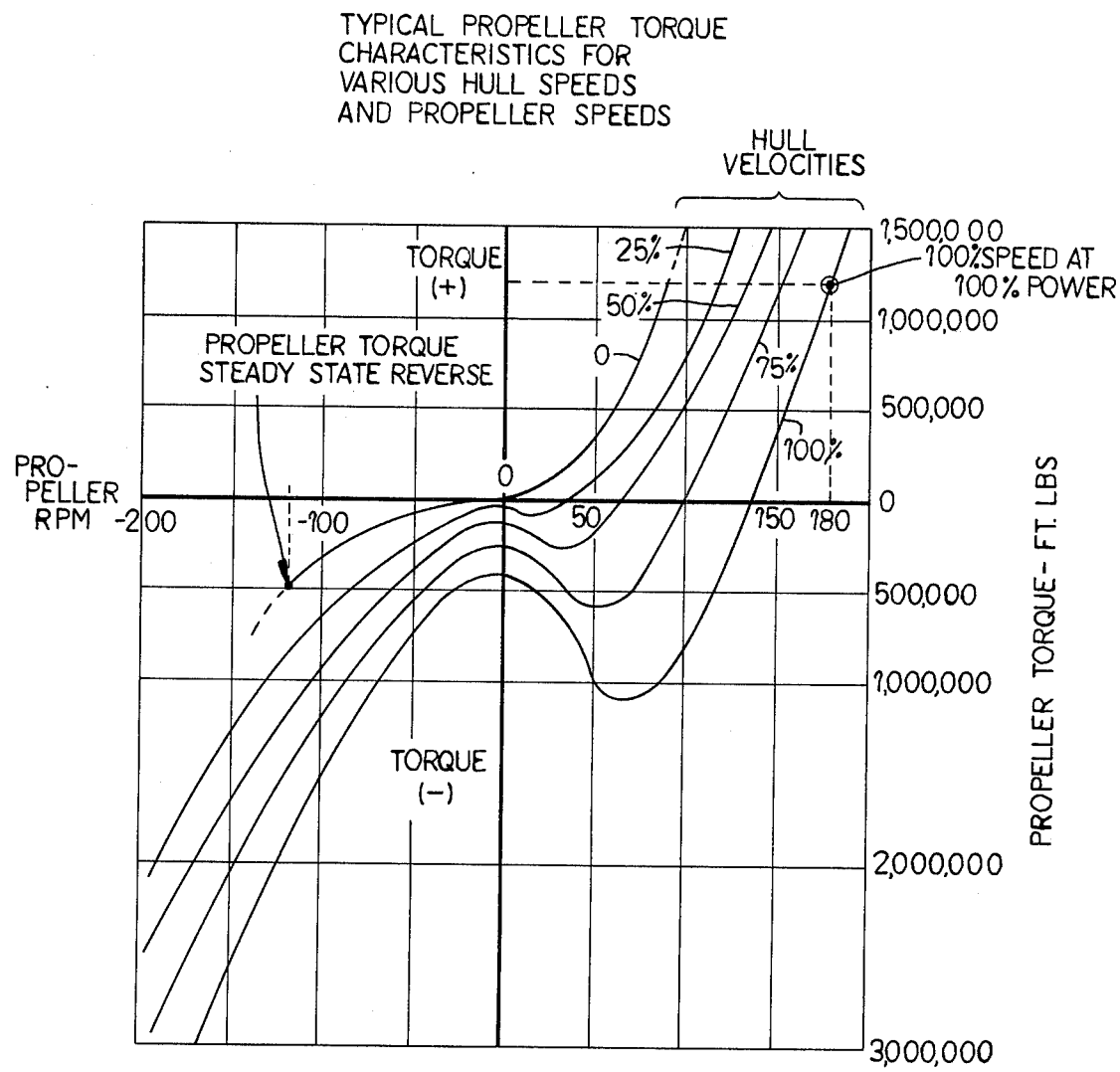
Figure 24:
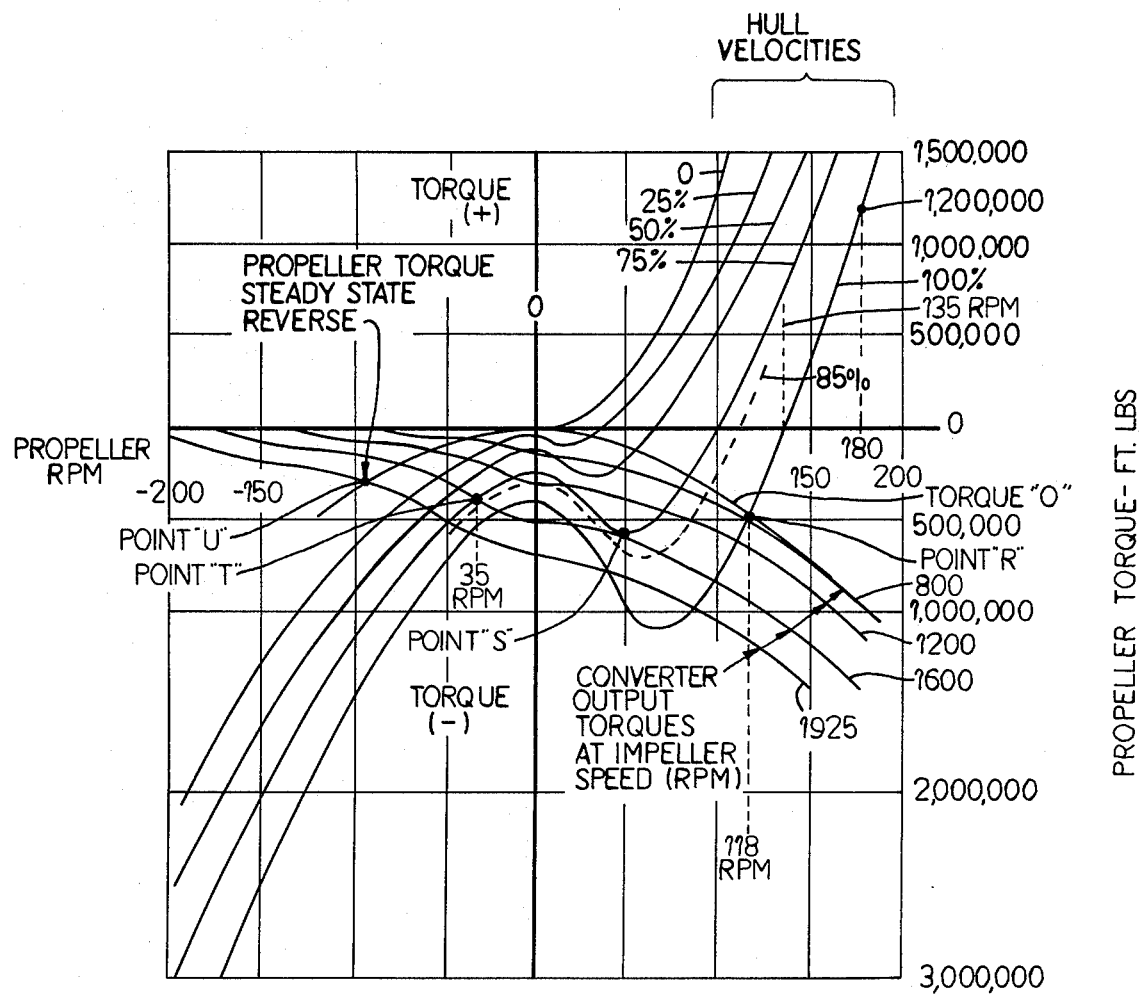

FIG. 23 is a graph of the four quadrant propeller torque and speed curves showing propeller characteristics with a given ship at all hull velocities; and FIG. 24 is a graph which shows a composite over-lay of the information of the graphs of FIGS. 22 and 23 and in a manner where the torque converter would actually perform if put into reverse drive.

DESCRIPTION OF A PREFERRED EMBODIMENT

The present invention finds particular utility in large high speed ships where it is necessary to effect a quick reversal of direction of the ship and which operation imposes severe transient loads on the transmission. After the decision to reverse the ship direction has been made, the ship continues in a forward direction for a distance commonly referred to as the "reach" of the ship. While the ship is still travelling forward, it is necessary for the propeller to be not only stopped from rotating in the forward direction, but then driven in a reverse direction. This creates high torque loads on the transmission. The magnitude of these torques are dependent on hull velocity and are shown typically in FIG. 23.

The transmission provided by the present invention includes a prime mover PM or (power source) such as a gas turbine engine or diesel engine and while only one prime mover has been shown for one propeller, it is common practice to use two of the transmissions shown in these views for driving one propeller. However, since the two transmissions would be similar, only one will be shown and described. In regard to the prime movers, it is necessary, in order to prevent damage thereto, to prevent high torque forces from being transmitted from the propeller or transmission gearing back into the prime mover PM.

The transmission of the present invention also includes a fixed pitch propeller 1 (FIGS. 1 and 2) which is attached to a propeller shaft 2 which in turn has a large gear 3 secured to its opposite end and which meshes with a compound reduction gear 4. The larger element of the reduction gear 4 is in constant mesh with a gear 5 that is fixed to the sleeve 6. The propeller, as will appear, can be driven either forwardly to drive the ship in the forward direction or it can be rotated in the opposite or rearward direction to drive the ship in the reverse direction.

The transmission also includes a disengageable means which is shown in some figures as a friction type clutch and which is shown in other figures such as FIG. 2 as a hydraulic torque converter. In either event, the friction type clutch C has its outer drum 7 secured to output shaft 8 that extends from the prime mover, while the output spider 9 of the clutch is fixed to the sleeve 6. The drive shaft 8 of the prime mover extends through the transmission and at its rear end has a gear 10 fixed therewith and which is in constant mesh with a reversing gear 12. The reversing gears include the compound gear 13 which meshes with an idler gear 14 which in turn meshes with the gear 15 secured to a sleeve 16. It will be appreciated that the various gears and sleeves are suitably journalled on antifriction bearings and thereby rotatably supported in the conventional manner and as schematically indicated.

Figure 3:
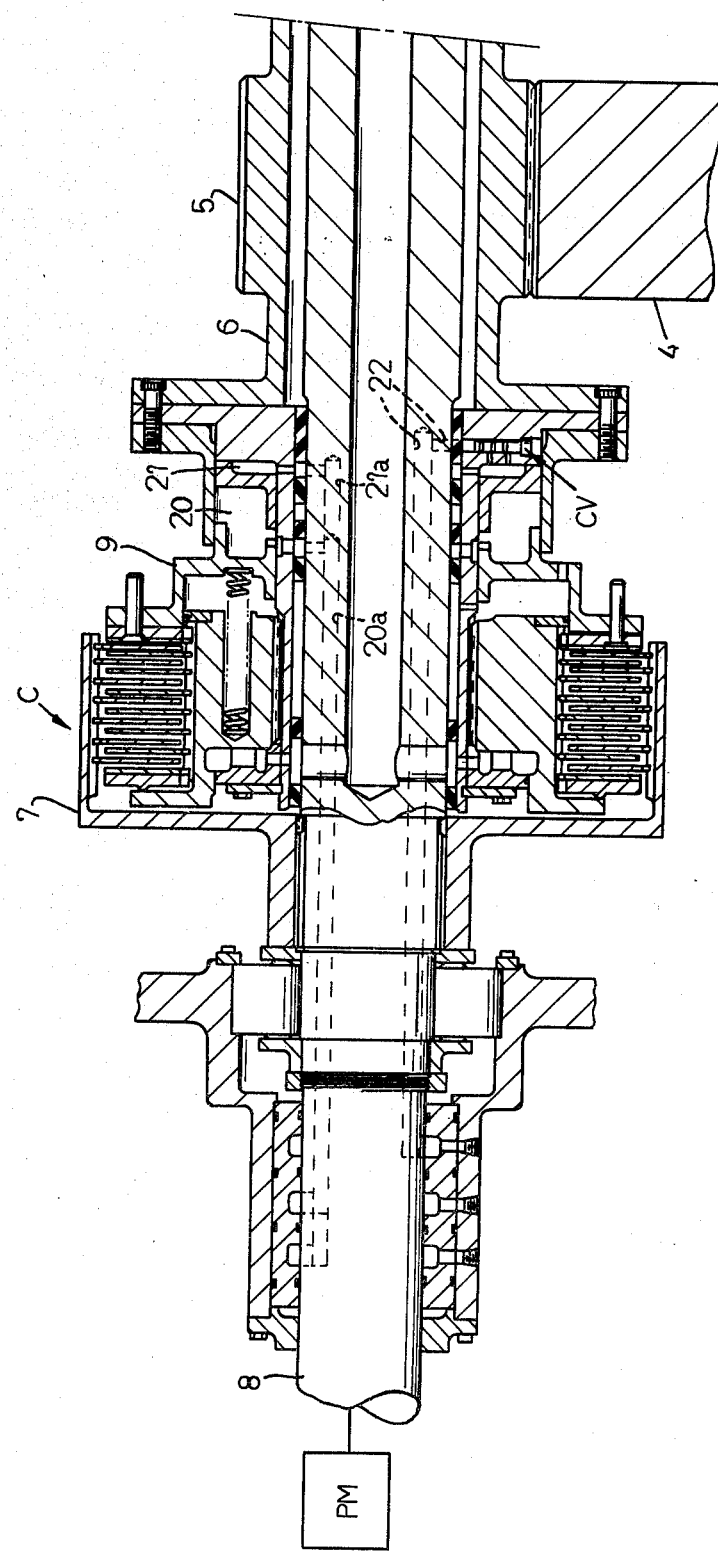
FIG. 3 is an enlarged, longitudinal cross-sectional view of the clutch shown in FIG. 1.
Figure 4:
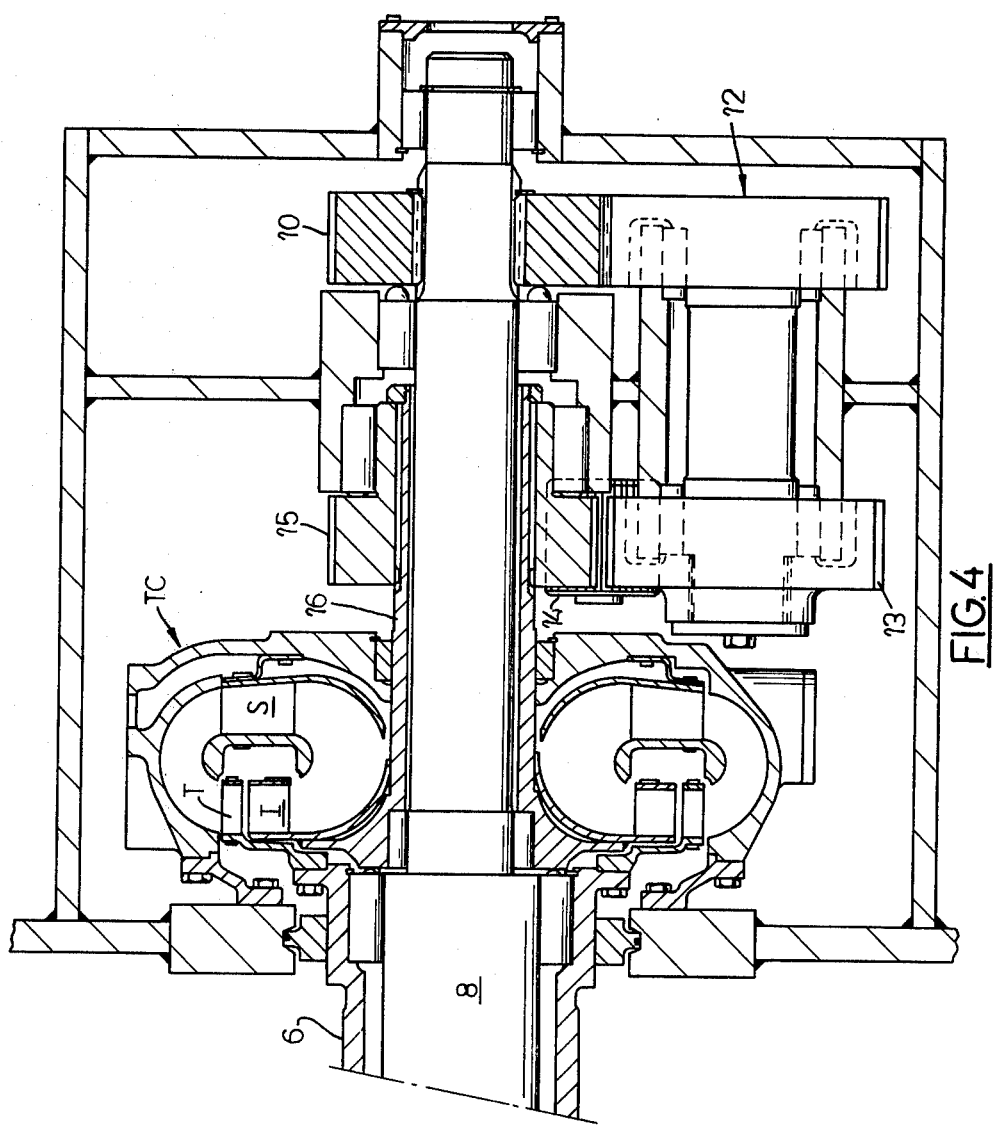
FIG. 4 is an enlarged, longitudinal cross-sectional view of the torque converter and its reversing gear shown in FIGS. 1 and 2.

The clutch C previously referred to and as clearly shown in FIG. 3 may take various forms but is preferably of the type shown in detail in U.S. Pat. No. 3,833,100 issued Sept. 3, 1974 to George R. Aschauer, and which has been assigned to an assignee common with the present invention. That clutch also includes a centrifugal valve CV of the type shown and described in another patent assigned to an assignee common with the present invention; namely U.S. Patent to Hilpert No. 3,352,395 issued Nov. 14, 1967. Generally, the interleaved plate type friction clutch shown in FIG. 3 is of the modulating type by means of which the power being transmitted therethrough can be varied by permitting the clutch to slip or alternatively the clutch may be completely locked up to form a solid drive connection or it can be completely released or disengaged. This modulating clutch is centrifugally controlled and has the thermal ability to control the modulating speed by slipping. The clutch has two sources of pressure apply fluid so that in the event one fails, the other will continue to cause the clutch to function in the proper manner. In other words, there is a pressure apply chamber 20 and a pressure apply chamber 21 which can be filled with pressure fluid through suitable rifle drillings 20a and 21a, respectively, in the shaft.

This particular clutch can have two operational modes, one being to keep the clutch fully synchronized and locked up from 100 percent r.p.m. down to 50 percent r.p.m. of the propeller. Then from 50 percent to lesser values the engine is to be held at constant speed or allowed to decrease in speed while the propeller can be modulated through slippage in the clutch. The above described modulatable friction type clutch is preferable for the forward drive mode of a ship of this character for various reasons, among which is its high efficiency when locked and its ability to modulate the propeller to low speeds for maneuvering. However, the use of a clutch for the reversal process is generally unsatisfactory because of the tremendous heat generated during propeller crash reversals at high hull speeds.

By means of the centrifugal valve CV, which receives fluid apply pressure through passage means 22, the clutch can maintain propeller speed at the value set by the operation, regardless of changes within the clutch of coefficient of friction or other variables. A more complete description of the clutch, its structure and its operation is deemed to be neither necessary nor desirable, but if such is desired, reference may be had to said patents.

Figure 5:
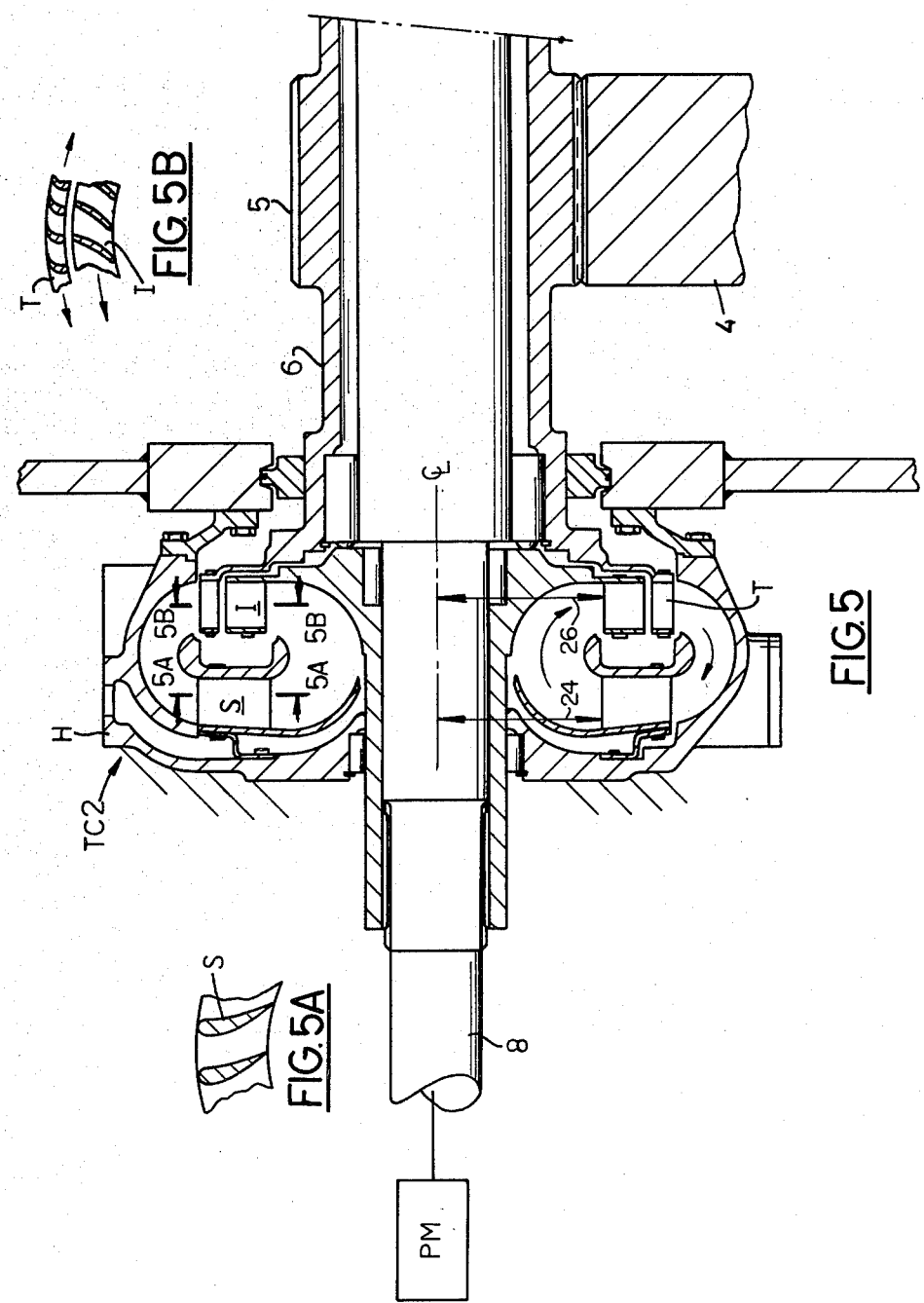
FIG. 5 is an enlarged, longitudinal cross sectional view of the forward driving torque converter shown in the left hand portion of FIG. 2.
Figure 6:
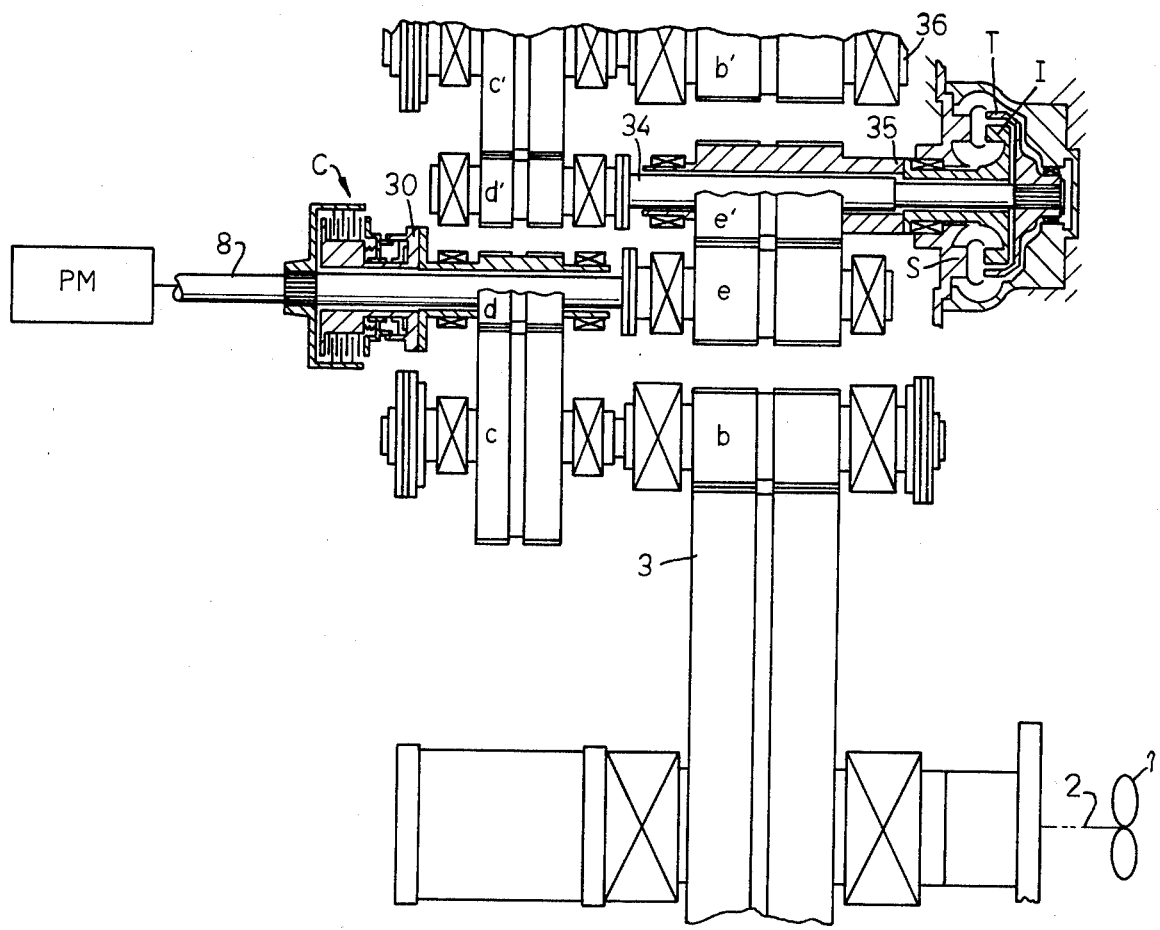
FIG. 6 is a view of another form of the invention, more or less in schematic form and certain parts being shown as broken away or in section for the sake of clarity in the drawings.

The torque converter TC to be referred to hereinafter and which is used with the present invention is of the single stage, fixed housing type which, as clearly shown in FIG. 5, has a fixed or non-rotating housing H. These torque converters have a fixed stator S which may have blades of the form shown in FIG. 5a and these blades may be adjustable. The particular type torque converter also has an impeller I and a turbine T which have blades of the shape, for example shown in FIG. 5b. The impeller I acts as a pump and generates fluid flow in the direction of the curvilinear arrows in FIG. 5, namely in a radial outflow direction. This side of the toroidal path is known in the art as the "outflow" side. The fluid then flows radially inwardly at the opposite side of the toroidal path where the stator is located, i.e., in the "inflow" side of the toroidal path. The stator outlet radius 24 is approximately the same as the impeller inlet radius 26. It will be noted that this type of torque converter has a stator located on one side of its toroidal path while the impeller and turbine are both located on that side opposite of the toroidal path to which the stator is located. Another characteristic of this torque converter is that the turbine is located radially outwardly of the impeller. The flow of hydraulic fluid is indicated by the curvilinear arrows in FIG. 5 and these torque converters are filled with fluid when they are to be operative and can be quickly dumped in the conventional manner when they are to be inoperative. These converters have particular characteristics which will be referred to hereinafter. If for some reason a more complete description of the function and structure of these converters is deemed to be either necessary or desirable, reference may be had to my U.S. Pat. No. 3,360,935 issued Jan. 2, 1968. These torque converters may also be of the type shown in the U.S. Pat. to Black No. 4,009,571 issued Mar. 1, 1977, or in the U.S. Pat. to Dundore, No. 4,012,908 issued Mar. 22, 1977, and all of which patents have been assigned to an assignee common with the present invention.

Referring again in more detail to FIG. 1, the torque converter TC previously described has its impeller secured to sleeve 16 for being rotatably driven thereby. The turbine T is driven by the impeller and is attached to the sleeve 6 so that the output of the torque converter drives the gears 5, 4 and 3 to thereby drive the propeller. The rotation of the propeller is in the reverse direction due to the reverse gears 12, 13 and 14.

The propeller 1 in FIG. 1 is driven in the forward direction when the clutch C is engaged and power is transmitted through sleeve 6, gears 5, 4 and 3. When the propeller is driven in the forward direction, the torque converter is emptied and consequently provides no driving power. When the propeller is to be driven in the reverse direction, the clutch C is disengaged, the torque converter is filled, and power from the prime mover is transmitted directly by shaft 8 through gears 10, 11, 12, 13, 14, 15 and to the impeller I of the torque converter TC. The torque converter turbine then drives the sleeve 6, gears 5, 4 and 3 to thus rotate the propeller in the reverse direction.

It will be appreciated that generally a torque converter is less efficient than the friction type clutch but this efficiency can be tolerated when the ship is moving in reverse because when it is moving in reverse, it is generally at lower speeds and for shorter periods of time. These needs are generally much less in horsepower than the forward hull movements and thus some inefficiency can be tolerated.

With the arrangement of FIG. 1, the friction type clutch provides a particularly efficient drive when the vessel is to be propelled in the forward direction at high power. Under some circumstances however, it may be desirable to use another torque converter as the disengageable means between the prime mover and the gear means in FIG. 2 shows the use of a second torque converter TC2 in the transmission. In that embodiment, the impeller is secured to the drive shaft 8 of the prime mover and when the torque converter TC2 is filled, the power output from the torque converter turbine T is delivered to the sleeve 6 so that the propeller is again driven in the forward direction. It will be understood that when the torque converter TC2 is filled and operative, the rearward torque converter TC is not filled and is inoperative. When it is desired to drive the propeller in the reverse direction, the torque converter TC2 is emptied and the torque converter TC is filled. Thereby the torque converter TC functions as it did in the device in FIG. 2 to drive the propeller in the rearward direction. Similar parts in FIGS. 1 and 2 have been similarly numbered.

The modification shown in FIG. 2 can be utilized for example in work boats where equal speed in either direction is desired. In other words, where the boat is frequently used in the reverse direction and full hull speed reversals in either direction are common, this modification may be desirable.

The use of torque converters to drive both forward and reverse as shown in FIG. 2 does lower efficiency in the forward mode to the range of 80%. This sacrifice in efficiency is made up by the increased ability to make full hull velocity forward to reverse shifts (in the reverse converter TC) and the added ability to make reverse to forward shifts (in the forward torque converter TC2).

FIGS. 6 AND 7 MODIFICATION

Figure 7:
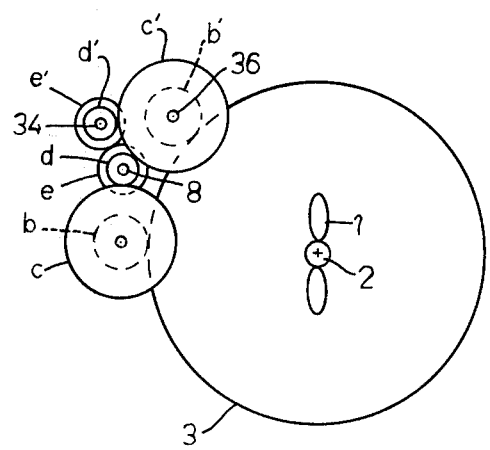
FIG. 7 is a schematic transverse sectional view of the gear arrangement shown in FIG. 6.

In this modification, parts similar to those previously described have been similarly numbered and a further detailed explanation of these parts is not deemed necessary nor desirable. In this modification however, it will be noted that the output shaft 8, when the clutch C is engaged, acts to provide power through the output member 30 of the clutch to which is attached the gear set d. Gear d is in constant mesh with gears c and c' which in turn are fixed on their respective shafts with gears b and b', respectively. Gears b and b' are each in constant mesh with the large gear 3 that is fixed to propeller shaft 2. A small gear set e is also fixed to shaft 8 and is in constant mesh with and drives the reversing gear e' which is freely journalled around a second shaft 34 which is parallel to shaft 8. The sleeve portion 35 of gear e' is drivingly connected with the impeller I of the torque converter TC and the impeller drives the turbine T of the torque converter, which turbine is in turn secured to the rear end of shaft 34. Thus, the torque converter drives shaft 34 and in turn drives the gear d' which is fixed to that shaft. Gear d' in turn is in constant mesh with and drives the gears c, c', all as clearly shown in FIG. 7. Gear b' is fixed on the same shaft 36 as is gear c' and this gear b' is also in constant mesh with the gear 3. Thus, the gear e' drives the impeller I of the torque converter to thereby rotate in the direction opposite to that of the engine. Thus, when the clutch C is disengaged, and power is transmitted directly through shaft 8, gear e, gear e', and the filled torque converter, the power to the propeller is reversed.

FIGS. 8 AND 9 MODIFICATION

Figure 9:
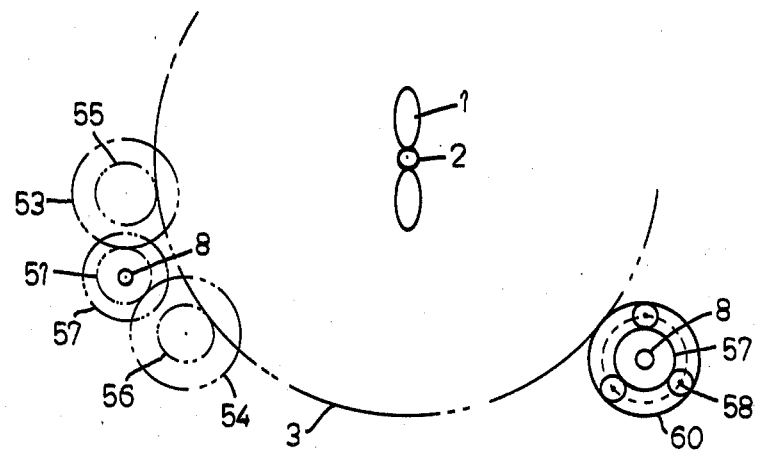
FIG. 9 is a schematic, transverse cross sectional view of the gear arrangement shown in FIG. 8.

In the device shown in FIGS. 8 and 9, the reversing mechanism is accomplished by a planetary gear mechanism 50 as follows. The output shaft 8 of the prime mover PM when the clutch C is engaged, drives the gears 51 secured to the output sleeve 52 of the clutch. The small gears 51 are in constant mesh with the larger gears 53 and 54. Gears 53 and 54 in turn are fixed to the same shafts as the gears 55 and 56, respectively and these gears 55 and 56 in turn are in contant mesh with the large propeller gear 3. When the clutch is engaged, the propeller is thereby driven in the forward direction through gears 51, 53, 54, 55, 56 and 3.

In order to reverse the direction of the propeller rotation, clutch C is disengaged and the power is transmitted directly through shaft 8 to the sun gear 57 fixed to the end of shaft 8. Sun gear 57 rotates the planetary pinion gears 58 whose carrier in turn is fixed or grounded as indicated. This causes counter rotation of the planetary gear carrier 60 which is connected to the impeller I of the then filled torque converter TC. The turbine T of the torque converter is then driven by the impeller and consequently the output of the torque converter is through the sleeve 52, gears 53, 54, 55, 56 and 3 and to the propeller, in the opposite direction.

In this manner, in this modified form of the invention, when the clutch is engaged and the torque converter TC is emptied, the propeller is driven in the forward direction. To drive the propeller in the reverse direction, the clutch is disengaged and the torque converter is filled and thereby operative to be then driven through the reversing gear mechanism 50 to thereby drive the propeller in the reverse direction.

FIGS. 10-15 MODIFICATION

The torque converter shown in FIGS. 10 to 15 are again of the single stage, fixed housing type having the stator and impeller and turbine blades arranged as previously described, except as will be now noted.

Figure 8:
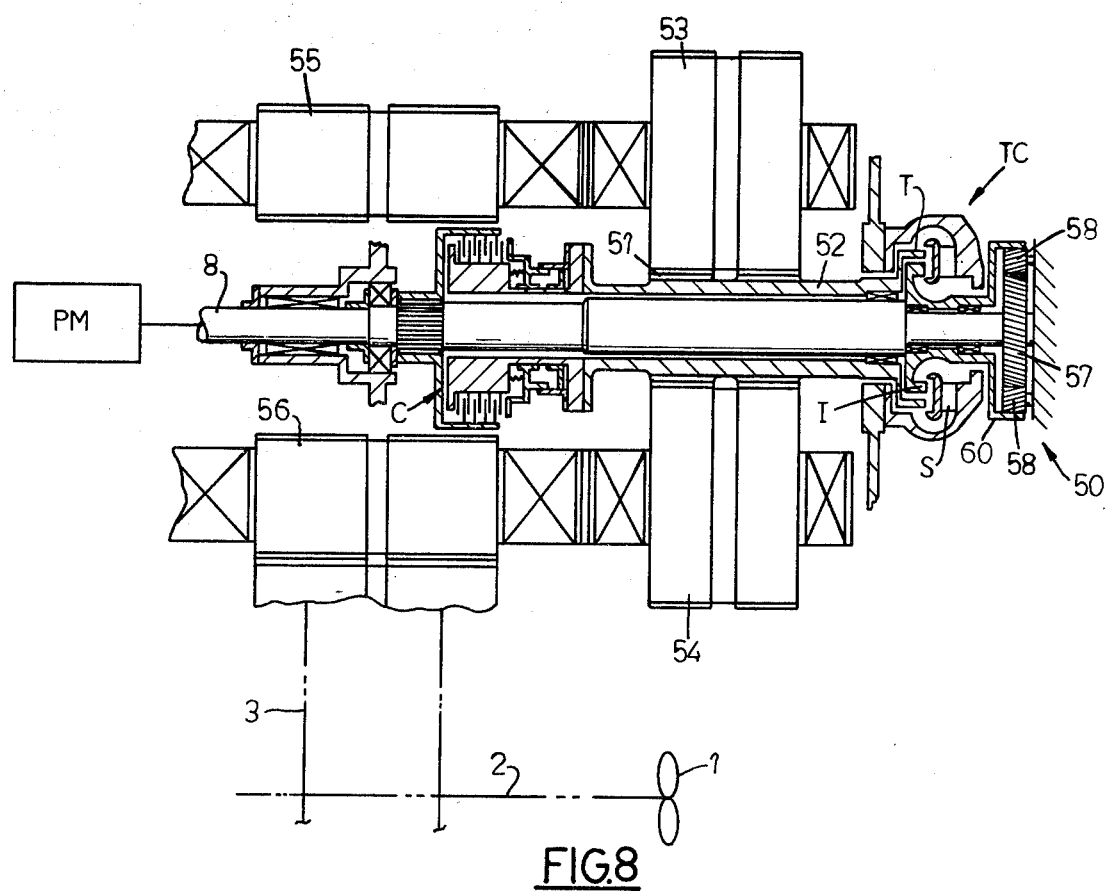
FIG. 8 is another form of the transmission provided by the present invention, the view again being in more or less schematic form with certain parts shown in section or broken away for the sake of clarity in the drawings, the reversing gear in this form is a planetary train with fixed carrier instead of the form shown in FIGS. 1 and 2.

The transmission shown in FIGS. 10 and 11 is somewhat similar to that shown in FIG. 8 (and similar gears and other parts have been similarly referenced) except that reversing of the torque converters in FIGS. 10 and 11 is accomplished by a reversing blade R in the torque converter, the remainder of the torque converter being the same as those previously described. No reversing gear train is required.

These reversing type torque converters act to reverse the direction of the output of the torque converter from its input. Thus, when the clutch C is disengaged, the power is transmitted from shaft 8 through the torque converter and is reversed thereby to drive the propeller in the reverse direction.

The FIG. 10 reversing torque converter RTC is shown in more detail in FIGS. 12-14 wherein the reverse blade R is of the fixed type, that is, it is fixed in the flow path. With this stationary reversing blade, the turbine rotation is in the opposite direction from the impeller input.

In the FIG. 10 modification, the forward drive can be handled by the previously described torque converter TC, when it is filled, for transient reversals and for low speed maneuvering, the impeller being connected to and driven by shaft 8. A wet friction clutch C1 is also provided to drive in the forward direction for high efficiency and/or high horsepower operation. Forward to reverse transients are handled by the reversing torque converter RTC. Reverse to forward transients are handled by the forward torque converter TC. The advantage of this modification is to allow reverse to forward transients at high hull speeds and take the energy of these higher hull speeds in the forward torque converter TC, rather than in the forward clutch.

The reversing torque converter of FIGS. 12–14 can be used to replace the conventional torque converter (TC) and gear train as shown in FIGS. 1, 2, 4 and 8.

The torque converter RTC2 shown in FIG. 11 is more clearly shown in detail in FIG. 15 and is similar to that of FIG. 12 except that the reversing blade RR can be axially withdrawn to a location within the center of the torque converter and out of that fluid flow path where it is ineffective. Thus, the torque converter shown in FIG. 15 can change turbine rotation from positive to negative, i.e., it can operate the turbine in either direction with a constant input rotational direction.

The FIG. 11 modification uses a wet friction clutch or a jaw clutch C2 engaged by the freewheel action of the output overrunning the prime mover for forward drive. Reverse drive requires a fixed housing single stage reversing torque converter. The reversing blade stage in this converter is to be axially movable so that the converter output is either in the same direction as the input or in the opposite direction to the input. Forward drive is attained by removal of the reversing stage by active circuit flow. The ship may be propelled forward for slow speed maneuvering by the hydraulic torque converter and may be operated at high speed and high efficiency by engagement of the forward friction clutch or forward jaw clutch when 1.0 speed ratio in the forward mode is reached.

Both forward and reverse transients are handled by the reversing torque converter with the appropriate insertion of the reversing stage. The advantage of this concept over others shown, is that it uses only one torque converter instead of two and transients from forward to astern, or astern to forward are both handled within the same hydraulic torque converter.

FIG. 16 MODIFICATION

The device of FIG. 16 utilizes a gear means 60 for reversing the power input to the torque converter TC. More specifically, when clutch C is disengaged, spur gear 62 fixed on the end of power shaft 8 drives spur gear 64 which in turn drives the impeller I of the torque converter TC. The driven turbine T (output of the torque converter TC) then drives the gear 65 which in turn drives gears 66, 67 and gears 68 and gears 69 to thereby drive the propeller shaft 2.

The torque converter TC is of left handed blading and is used for steady-state reverse operation and for transient reversals from ahead to astern.

A second or optional torque converter TC3 may be provided when it is desired to use a torque converter for driving the ship in the forward direction rather than the clutch C. More specifically, it is used for forward operation speeds and transient reversals astern to ahead. This torque converter TC3 has right hand blading. In other words, the torque converter TC3 could be used to ring the ship up to speed, via gears 61, 66, 67, 68 and 69. Then the clutch would be engaged whereupon power would flow through clutch C, gear 61 and then through to the propeller.

The concept of FIG. 16 and others shown herein (FIGS. 10, 11, 17) is to use a torque converter for forward maneuvering and astern-to-forward reversals, and to use a clutch for steady-state high efficiency operation. The engagement of this clutch can thus be made at no relative speed and hence at no energy into such a device. The forward torque converter can first be used to bring the propeller up to speed at some moderate hull velocity. The engine throttle may then be temporarily decreased until a speed ratio of plus 1.0 is achieved in the torque converter. The clutch could then be engaged at no relative motion. For this reason, the clutch in FIGS. 10, 11, 16 and 17 need not be a wet friction clutch but could in essence be a jaw clutch. A suitable mechanism for sensing synchronous speed would be required, such as a freewheel built within the jaw clutch, to indicate proper engagement time for this jaw clutch.

When the torque converter TC3 is operational (filled), the torque converter TC is not operative (empty) and vice versa.

When the clutch C is engaged to drive the propeller in the forward direction, thereby driving gear 66 directly, through gear 61, the two torque converters TC and TC3 are both unfilled and inoperative.

FIG. 17 MODIFICATION

In this modification of the invention, a torque converter TC has left hand blading. The planetary gear train 70 reverses the direction of and reduces the torque converter input speed. This converter TC functions to reverse the direction of the propeller rotation, when the forward clutch C is disengaged, power is transmitted directly through shaft 8 to the sun gear 71 of the planetary gear mechanism 70. Planet gears 72 are carried by a rotatable clutch drum 73 of a friction clutch 74. The clutch hub 75 is fixed.

Clutch C may be a wet friction clutch of an overrunning freewheel with a jaw clutch.

When the clutch C is engaged, power is transmitted from the shaft 8 to the clutch housing 80 and gear 81 which in turn directly drives the gears 82, 83 to in turn drive the gear 84 and its propeller 1 in the forward direction. Another torque converter TC5 has its turbine connected to the clutch housing 80 to provide slow speed maneuvering and for transient reversals from astern to ahead.

TORQUE CONVERTER CHARACTERISTICS

As previously mentioned, the torque converter used with the present invention is of the single stage, fixed housing type wherein a fixed stator is located at one side of the toroidal path of the fluid, while the impeller and turbine are located at the opposite side of the toroidal path, and furthermore, the torque converter of the present invention has its turbine located radially outwardly of the impeller. The above torque converter provides unique characteristics which render it peculiarly adaptable for reverse operations for high speed, fixed pitch propellers. Generally, with this type of torque converter, high torque amplification is possible in the negative speed ratio zones with no collapse or decay of the output torque of the torque converter turbine as the negative speed ratio increases.

Figure 18:
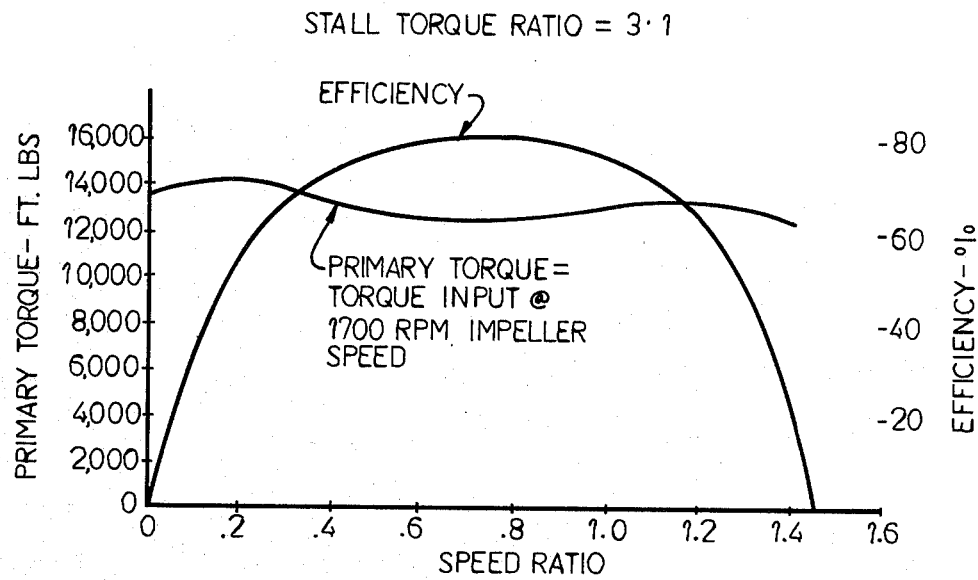
FIG. 18 is a graph of the primary torque plotted against speed ratio of the type of torque converter used with the present invention and also showing the efficiency plotted against the speed ratio.

FIG. 18 is a performance curve for this type of torque converter and showing the efficiency plotted against the speed ratio of operation and primary torque, which is defined as an absorbed torque of the impeller operating at a constant speed of 1700 r.p.m. at the speed ratios shown. Appropriate torque converter size and gear ratios were chosen and a torque converter is chosen for steady-state operation so that the torque converter would operate in excess of 80 percent efficiency.

Figure 19:
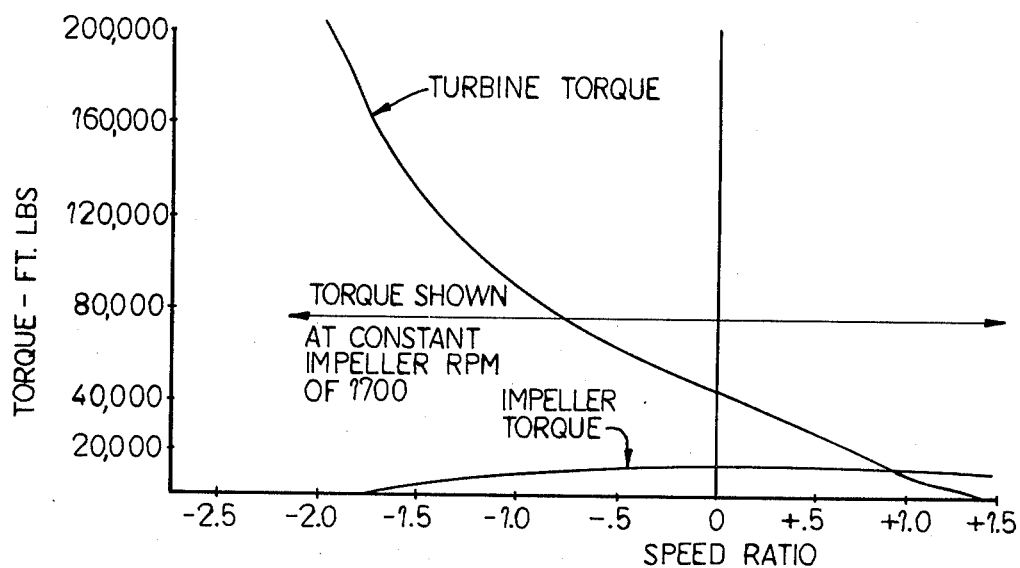
FIG. 19 is another graph of the output torque and input torque at a constant input speed plotted against speed ratio of the torque converter provided by the present invention. The unique characteristics of the output torque and the input torque in the negative speed ratio area are most important to this application.

FIG. 19 shows generalized torque converter characteristics of this type of torque converter, but in operating modes different than that under which the torque converter delivers postive horsepower. FIG. 19 plots both the output torque and the input torque of the converter from speed ratios of zero through positive (+) 1.5, this being the normal operation mode of the converter. Also plotted is the operational characteristics in the negative speed ratio (zero to minus (−) 2.0) mode and here it will be noted that in this mode the converter undergoes the transient from full ahead to full reverse when a crash astern reversal of the ship is made. It should be noted that the input torque continuously decreases from zero speed ratio down to minus (−) 2.0 speed ratio, thus showing the impeller is required to do less work as the negative speed ratio increases. At the same time, the output or turbine torque continuously increases at an appreciable rate during this same operating mode, illustrating that there is considerable output torque while very little if no torque is being required of the input of the converter.

When the ship is operating in the transient reversing mode with the present torque converter, high output torques are not reflected back to the prime mover and it is impossible to turn the prime mover backward.

Figure 20:
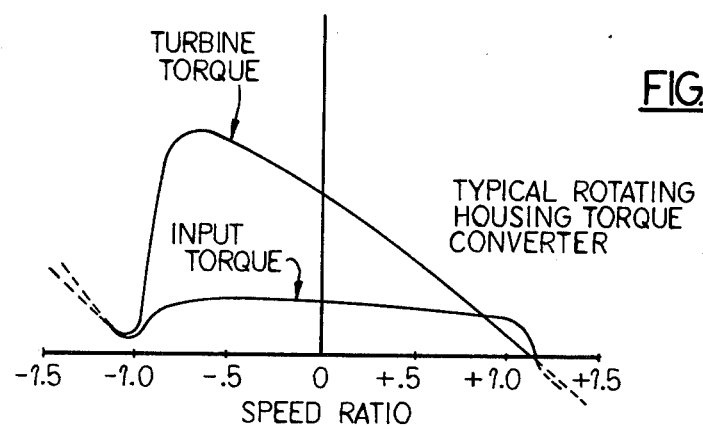
FIG. 20 is a graph similar to FIG. 19 but showing the output and input torque characteristics of a typical torque converter of the type having a rotating housing and not of the type of the present invention.
Figure 21:
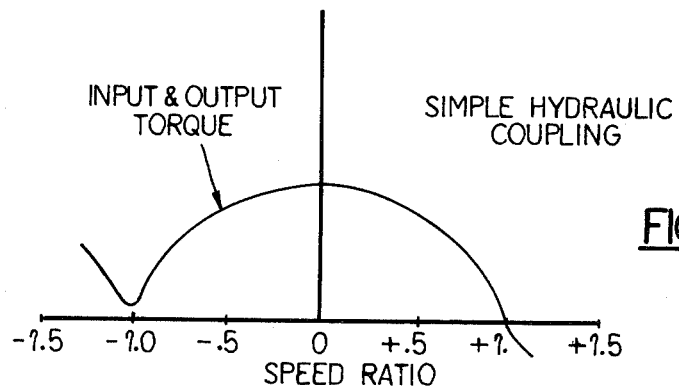
FIG. 21 is a graph similar to FIG. 19 but showing the torque characteristics of a simple hydraulic coupling and not of the type of the present invention.

FIGS. 20 and 21 are generally similar graphs, but illustrate the characteristics of two prior art types of devices. For example, FIG. 20 shows the output torque of a rotating housing type torque converter and it will be noted that at the negative speed ratio of minus (−) 1.0, the output torque collapses to a very low value.

FIG. 21 is a similar graph of output torque and input torque such as would be found in the transmission of the Lysholm U.S. Pat. No. 2,140,324 which takes the characteristics of a simple hydraulic coupling for reversal. With that prior art device, the output decreases continuously once the negative speed ratio is commenced. Since a hydraulic coupling has equal input and output torques, the operation in the negative speed ratio during a propeller reversal would be limited by the performance shown in FIG. 21, and when high torque capability is present, near stall, the prime mover would be lugged down by the resultant torque absorption.

With the present invention, large output torque is possible to reverse the propeller and the need from the prime mover in the front of the torque converter is very low. Inasmuch as the input into the torque converter is low, the engine speed can be changed because it is not under the influence of a large load and consequently, the operator can pre-plan the ship reversal, schedule it for a particular time of reversal, as well as scheduling the torque to be put through the propeller shaft, all of which permit him to program the "reach" permitted during the reversal operation. The performance characteristic of low impeller torque requirements during negative speed ratio operation also contribute in limiting the torque and power to be translated through the reverse gear train. Since this train is always located between the prime mover and the input to the torque converter, the power put through this reverse train is limited by the converter input characteristics.

FIG. 22 shows the actual output torque of the present torque converter at various revolutions of its turbine from zero through the positive regime and from zero through the negative regime. This famiy of curves shows output torque at different constant torque converter impeller speeds. It also plots the input torque absorbed from the engine at the same impeller speeds and the graph illustrates how this input torque decreases as the negative converter turbine speed rises.

The graph of FIG. 23 is a four quadrant propeller torque, speed curve showing propeller characteristics at various ship velocities. It will be noted that at 100 percent ship velocity and full propeller speed forward (say 180 r.p.m.), the propeller torque is such as to absorb 41,000 horsepower from the prime movers. Following this 100 percent ship velocity curve to slower speeds, it is noted that the propeller curve crosses zero at about 135 r.p.m. This is the speed that the propeller would slow down to if detached from the power source prime mover while the ship continues to move forward at 100 percent velocity. Therefore, this is the speed that the propeller achieves when disconnected from forward power source and is the initial speed from which the propeller reversal must commence. This curve also illustrates that at the same ship velocity but at lesser positive propeller speeds, a large negative torque component is generated with the propeller before the latter can be brought to a stop. Therefore any device that is to bring the propeller to zero speed and finally reverse the propeller while the ship velocity continues at high speed must generate a considerable amount of negative torque just to bring the propeller speed to zero. Families of propeller characteristic curves are shown for other hull velocities with appropriate decrease of negative torques as the ship velocities decrease, until there is actually no negative torque achieved at zero ship velocity. It is because of these types of propeller-hull interactions that the main parameter previously mentioned before for energy input for propeller reversals is the hull speed itself.

The graph of FIG. 24 shows the same propeller curve as previously discussed in connection with the graph of FIG. 23 together with the converter characteristics of the graph of FIG. 22 overlayed thereon and in the manner that the torque converter would actually perform if put into the reverse train drive as previously described. The above complete ship four quadrants are shown of a ship that require 41,000 horsepower to turn the propeller forward at 180 r.p.m.

When the reversal is to be made and the forward clutch disconnected, the propeller will drop to zero torque or about plus (+) 135 r.p.m. Since the torque converter is rotating, but empty at this time, the turbine is rotating in reverse at a speed in keeping with the plus (+) 135 r.p.m. propeller and the converter impeller is rotating in normal forward direction, being attached to the engine. This defines a negative speed ratio operation in the converter of somewhere between minus (−) 1.0 and minus (−) 1.25. The filling with oil of the torque converter thereby will generate torques as shown in FIGS. 19 and 22. The turbine torque or restraining torque on the propeller continuing in the positive rotation direction is substantial, while the impeller torque that loads the engine is rather negligible.

The torque converter characteristics shown in FIG. 24 are those that would be the output of only one engine and one torque converter of the two that would be required to achieve 180 r.p.m. in forward. Thus, the transient torques shown here at the converter output are those of only one converter in the power train. If both engines and both torque converters are used, then twice as much torque as shown here will be available at every speed. The amount of torque that will be available of course can be governed by throttle setting on the gas turbine to generate impeller speeds in the converter from 1,925 (3,600 on gas turbine) down to 600 r.p.m.

To follow through the transient condition on the FIG. 24 curve, reversal is initiated at 180 propeller r.p.m. and 1,200,000 lbs. ft. of positive propeller torque. Disengagement of the forward clutch with no decrease in hull speed allows the propeller torque to drop to zero and the speed to fall to plus (+) 135 propeller r.p.m. At this time, if the one torque converter shown here is filled with oil and the engine throttle dropped to idle, a retarding torque of approximately 500,000 ft. lbs. (point R) will be generated at the propeller, while the impeller torque reflecting back into the idle gas turbine engine will be practically nothing. Therefore, this point can be easily sustained by the engine without any appreciable absorption load. This torque in itself will slow the propeller to approximately 118 r.p.m. If this position is held for a short length of time, the slower than normal propeller speeds will decrease hull velocity to less than 100 percent. If we assume that it is held for no longer a time than to achieve 75 percent hull velocity, then by increasing the engine throttle to achieve 1,600 r.p.m. on the impeller speed, the negative turbine torque of the torque converter can exceed the high point occurring at approximately 50 propeller r.p.m. in the 75 percent hull velocity curve (Point S). This torque converter torque will therefore pull the propeller to zero r.p.m. and finally achieve a negative propeller r.p.m., even with no hull velocity change, of approximately minus (−) 35 r.p.m. (Point T). Further escalations of negative propeller speed can be achieved by only raising the engine governed speed to full speed and thus to 1,925 r.p.m. on the torque converter impeller.

Re-examination of FIG. 22 will show that the load on the engine during this transient reversal is from a minimum of 50 to 100 horsepower at 1,000 to 1,200 r.p.m. gas turbine speed to a maximum of 6,000 horsepower at gas turbine speeds of 3,600 r.p.m. Since this is such a small portion of the power of the gas turbine, it is easily accelerated at a pre-planned scheduled rate as this transient is negotiated and thus dictate or schedule the actual torque out of the turbine wheel and thus the torque to reverse the propeller.

The torque converter once filled with fluid, takes the propeller from plus (+) 135 r.p.m. to zero to minus (−) 92 r.p.m. at whatever rate is chosen by the throttle operator. This present arrangement thus has the capability of reversing the propeller faster than before possible. It is also important to note that this rate of change can be scheduled by throttle rate change as desired and is a continuous process. The propeller goes from positive to zero to negative rotation without any discrete step changes. The steady-state operation of the vessel in reverse will take place when the impeller speeds are up to 1,925 r.p.m. and the hull is backing down as shown at point "U" (FIG. 24). This particular point occurs with the converter operation at 81 percent efficiency and at a speed ratio plus (+) 0.63. The converter at this point only absorbs about 6,000 horsepower out of a potential single engine capability of 20,500 (½ of 41,000 horsepower).

RECAPITULATION

The primary concern of the present invention is the transient period of reversing a large ship from a high speed forward direction to a reverse direction. The various modifications of the invention above described, illustrate a variety of ways to achieve the primary object of the present invention; namely to reverse a fixed pitch propeller at maximum hull speed and with a fixed housing, single stage torque converter that can provide large transient output torques to provide this reversal and with little need for high input torques or input horsepower during the reversal. The hydraulic torque converter is used for steady-state reverse operations, for slow speed maneuvering in reverse, and it can operate automatically from forward to astern with no sequencing steps. Because of the unique performance characteristics of this particular torque converter, it can initiate propeller reversals even from 100 percent forward hull speed and not reflect any high load on the gas turbine or other prime mover during this transient period.

More specifically, a torque converter of the type contemplated with the present invention provides good torque amplification that does not decay, in the negative speed ratio zone. During this reversing operation, high loads or other destructive forces are not transmitted back to the prime mover and it is impossible to turn the prime mover backwards thereby causing damage thereto. With the present torque converter used for reversal, large output torques are available to reverse the propeller and the requirements of input into the torque converter in this situation is very low and therefore require no appreciable work from the prime mover. Since this requirement is low at this stage, the prime mover can be varied because it is not hampered by a large load problem and the operator can pre-plan the reversal of the ship, schedule it precisely for time of reversal and determine the amount of torque to be put through the shaft and consequently how much "reach" is permitted after the reversal process commences.

In some of the above modifications of the invention, where a second hydraulic torque converter is shown for use in the forward mode, the intention is to be able to attain a mirror image operation of the propeller so that throttling from high astern speeds to forward speed can be handled in a similar manner in the forward torque converter.

The use of a forward torque converter in combination with a reverse torque converter, or the use of one torque converter to do both operations, permits the high horsepower, high efficiency clutch to be of a much less sophisticated design because it needs only to carry static loads and does not need to absorb energies in the astern-to-forward transient mode. Thus, the clutch can become essentially a jaw clutch lock-up when +1.0 speed ratio is obtained between the engine and propeller. By maneuvering in forward (or astern) in torque converter drive, and quickly reducing engine throttle position, the attainment of +1.0 speed ratio can trigger the engagement of a simple jaw clutch and thus, is possible to provide slow speed maneuvering and lock-up full throttle operation without the use of a friction clutch.

I claim:

1. A propulsion transmission for a fixed pitch propeller of a ship for use in crash reversal of said ship, said transmission comprising, a prime mover, a fixed pitch propeller selectively rotatable in forward and reverse directions, a disengageable means between said prime mover and said propeller, a hydraulic torque converter of the single stage, fixed housing type connected between said prime mover and said propeller, said converter having a non-rotatable housing which defines a radially outer bend of the toroidal path of the converter, said non-rotatable housing having an impeller and a turbine located on the outflow side of the toroidal path, said housing also having a stator fixed therein and preceeding said impeller and located at the inflow side of the toroidal path, the stator outlet radius being approximately the same as the impeller inlet radius, said torque converter having an operative and an inoperative condition, said disengageable means transmitting driving power from said prime mover to said propeller in said forward direction when said disengageable means is engaged and said torque converter is in said inoperative condition, said torque converter driving said propeller in said crash reversal when said disengageable means is disengaged and said torque converter is in said operative position.

2. The transmission set forth in claim 1 including reversing mechanism between said prime mover and the said torque converter.

3. The transmission set forth in claim 2 further characterized in that said reversing mechanism is a flow reversing blade in said torque converter.

4. The transmission set forth in claim 2 further characterized in that said reversing mechanism is gear means.

5. A propulsion transmission for a fixed pitch propeller of a ship for use in crash reversal of said ship, said transmission comprising, a prime mover, a fixed pitch propeller selectively rotatable in forward and reverse directions, gear means connected between said prime mover and said propeller for rotating the latter, a disengageable means between said prime mover and said gear means for driving said propeller in said forward direction when said disengageable means is engaged,
   a hydraulic torque converter of the single stage, fixed housing type connected between said prime mover and said gear means and for driving said propeller in said crash reversal when said disengageable means is disengaged, said torque converter having a non-rotatable housing which defines a radially outer bend of the toroidal path of the converter, said non-rotatable housing having an impeller and a turbine located on the outflow side of the toroidal path, said housing also having a stator fixed therein and preceeding said impeller and located at the inflow side of the toroidal path, the stator outlet radius being approximately the same as the impeller inlet radius.

6. The transmission set forth in claim 5 including reversing mechanism between said prime mover and the said torque converter.

7. The transmission set forth in claim 6 further characterized in that said reversing mechanism is a flow reversing blade in said torque converter.

8. The transmission set forth in claim 6 further characterized in that said reversing mechanism is gear means.

9. A propulsion transmission for a fixed pitch propeller of a ship for use in crash reversal of said ship, said transmission comprising, a prime mover, a fixed pitch propeller selectively rotatable in forward and reverse directions, gear means connected between said prime mover and said propeller for rotating the latter, a modulatable friction type clutch which can operate in a locked-up, high efficiency mode or in a maneuvering, slippable modulating mode between said prime mover and said gear means for driving said propeller in said forward direction when said clutch is engaged,
   a hydraulic torque converter of the single stage, fixed housing type connected between said prime mover and said gear means, said converter having a non-rotatable housing which defines a radially outer bend of the toroidal path of the converter, said non-rotatable housing having an impeller and a turbine located on the outflow side of the toroidal path, said housing also having a stator fixed therein and preceeding said impeller and located at the inflow side of the toroidal path, the stator outlet radius being approximately the same as the impeller inlet radius, and reversing mechanism between said prime mover and said torque converter, whereby said torque converter drives said propeller in said crash reversal when said clutch is disengaged.

10. The transmission set forth in claim 9 further characterized in that said reversing mechanism is a flow reversing blade in said torque converter.

11. The transmission set forth in claim 10 further characterized in that said reversing mechanism is gear means.

12. A propulsion transmission for a fixed pitch propeller of a ship for use in crash reversal of said ship, said transmission comprising, a prime mover, a fixed pitch propeller selectively rotatable in forward and reverse directions, gear means connected between said prime mover and said propeller for rotating the latter, a disengageable means between said prime mover and said gear means for driving said propeller in said forward direction when said disengageable means is engaged;
   a hydraulic torque converter of the single stage, fixed housing type, said fixed housing defining a radially outer bend of the toroidal path of the converter, said fixed housing having a stator on the inflow side of its toroidal path and having an impeller and turbine both located on the outflow side of the toroidal path, said turbine furthermore being located radially outwardly of said impeller, said stator preceeding said impeller in the flow path, the stator outlet radius being approximately the same as the impeller inlet radius; said converter being connected between said prime mover and said gear means, said prime mover connected with and for driving said impeller, said turbine being connected with said gear means, said converter thereby driving said propeller in said crash reversal when said disengageable means is disengaged.

13. The transmission set forth in claim 12 including reversing mechanism between said prime mover and said torque converter.

14. The transmission described in claim 13 further characterized in that said reversing mechanism is a flow reversing blade in said torque converter and located between said impeller and turbine.

15. The transmission of claim 13 further characterized in that said reversing mechanism is gear means.

16. A propulsion transmission for a fixed pitch propeller of a ship, said transmission comprising, a prime mover having a power output shaft extending therefrom, a fixed pitch propeller selectively rotatable in forward and reverse directions, a disengageable means connectible with said output shaft and located between said prime mover and said propeller, a second shaft arranged parallel to said power output shaft, a reversing gear freely journalled on said second shaft, a hydraulic torque converter of the single stage, fixed housing type and mounted on said second shaft, said reversing gear connected to said torque converter for transmitting power thereto, said second shaft connected to the output of said torque converter and driven thereby, gear mechanism between said second shaft and said propeller whereby said torque converter drives said propeller in a reverse direction through said second shaft and said gear mechanism when said disengageable means is disengaged, said torque converter having an operative and an inoperative condition, said disengageable means transmitting driving power from said prime mover to said propeller in said forward direction when said disengageable means is engaged and said torque converter is in said inoperative condition.

17. The transmission set forth in claim 16 further characterized in that said torque converter is further of the type having a stator on one side of its toroidal path and having an impeller and a turbine both located on the side of the toroidal path opposite to said one side, said turbine furthermore being located radially outwardly of said impeller, and said reversing gear is connected to said impeller, and said second shaft is connected to said turbine.

18. A propulsion transmission for a fixed pitch propeller of a ship for use in crash reversal of said ship, said transmission comprising, a prime mover, a fixed pitch propeller selectively rotatable in forward and reverse directions, gear means connected between said prime mover and said propeller for rotating the latter, a disengageable means between said prime mover and said gear means for driving said propeller in said forward direction when said disengageable means is engaged, reversing mechanism driven by said prime mover, a hydraulic torque converter of the single stage, fixed housing type connected to the output side of said reversing mechanism and driven thereby, said converter having a non-rotatable housing which defines a radially outer bend of the toroidal path of the converter, said non-rotatable housing having an impeller and a turbine located on the outflow side of the toroidal path, said housing also having a stator fixed therein and preceeding said impeller and located at the inflow side of the toroidal path, the stator outlet radius being approximately the same as the impeller inlet radius, the output of said converter being connected to said gear means to drive said propeller in said crash reversal when said disengageable means is disengaged.

19. The transmission set forth in claim 18 further characterized in that said reversing mechanism is a planetary gear means.

20. The transmission set forth in claim 18 further characterized in that said reversing mechanism is connected to said impeller, and said turbine is connected to said gear means.

21. The transmission set forth in claim 20 including a second torque converter having operative and inoperative modes, said second torque converter having an impeller fixed to said prime mover and driven thereby, said second converter also having a turbine connected to said disengageable means whereby either said disengageable means or said second converter can selectively drive said propeller through said gear means when said first mentioned torque converter is in the inoperative mode.

22. The transmission set forth in claim 18 including a second torque converter having operative and inoperative modes, said second torque converter having an impeller fixed to said prime mover and driven thereby, said second converter also having a turbine connected to said disengageable means whereby either said disengageable or said second converter can selectively drive said propeller through said gear means when said first mentioned torque converter is in the inoperative mode.

23. A propulsion transmission for a fixed pitch propeller of a ship for use in crash reversal of said ship, said transmission comprising, a prime mover having a power output shaft, a fixed pitch propeller selectively rotatable in forward and reverse directions, gear means connected between said prime mover and said propeller for rotating the latter, a disengageable clutch connectible to said prime mover shaft and also connectible to said gear means for driving said propeller in said forward direction when said disengageable clutch is engaged;

a hydraulic torque converter having operative and inoperative modes and being of the single stage, fixed housing type, said converter having a non-rotatable housing which defines a radially outer bend of the toroidal path of said converter, said non-rotatable housing having a stator on the inflow side of its toroidal path and having an impeller and a turbine both located on the outflow side of the toroidal path, said turbine furthermore being located radially outwardly of said impeller, said stator preceeding said impeller in the flow path, the stator outlet radius being approximately the same as the impeller inlet radius, a flow reversing blade in said torque converter and located between said impeller and turbine to reverse the direction of the torque converter turbine, said converter impeller being connected to said prime mover shaft and driven thereby, said torque converter turbine connected to said gear means, and thereby driving said propeller in said crash reversal when said disengageable clutch is disengaged.

24. The transmission of claim 23 including a second torque converter having operative and inoperative modes, said second torque converter having an impeller fixed to said shaft and driven thereby, said second converter also having a turbine connected to said clutch whereby either said clutch or said second converter can selectively drive said propeller through said gear means when said first mentioned torque converter is in the inoperative mode.

25. The transmission set forth in 1 or 5 or 12 or 16 or 18 further characterized in that said disengageable means is a friction plate clutch of the modulatable type which can operate in a locked up, high efficiency mode or in a maneuvering, slippable modulating mode.

* * * * *